(12) United States Patent
Watanabe et al.

(10) Patent No.: US 10,711,865 B2
(45) Date of Patent: Jul. 14, 2020

(54) SPEED REDUCING DEVICE FOR CARRIAGE AND DRIVING DEVICE FOR CARRIAGE

(71) Applicant: NABTESCO CORPORATION, Tokyo (JP)

(72) Inventors: Koji Watanabe, Mie-ken (JP); Ryutaro Dozaki, Mie-ken (JP)

(73) Assignee: NABTESCO CORPORATION, Tokyo (JP)

( * ) Notice: Subject to any disclaimer, the term of this patent is extended or adjusted under 35 U.S.C. 154(b) by 244 days.

(21) Appl. No.: 15/846,924

(22) Filed: Dec. 19, 2017

(65) Prior Publication Data

US 2018/0180137 A1    Jun. 28, 2018

(30) Foreign Application Priority Data

Dec. 27, 2016    (JP) .................................. 2016-253897

(51) Int. Cl.

| | |
|---|---|
| *F16H 1/28* | (2006.01) |
| *F16D 55/02* | (2006.01) |
| *B60K 17/04* | (2006.01) |
| *B60K 7/00* | (2006.01) |
| *B62D 51/00* | (2006.01) |
| *F16D 121/20* | (2012.01) |

(52) U.S. Cl.
CPC ................ *F16H 1/28* (2013.01); *B60K 7/00* (2013.01); *B60K 17/043* (2013.01); *B60K 17/046* (2013.01); *B62D 51/005* (2013.01); *F16D 55/02* (2013.01); *B60K 2007/0038* (2013.01); *B60K 2007/0092* (2013.01); *B60Y 2200/49* (2013.01); *F16D 2121/20* (2013.01)

(58) Field of Classification Search
CPC .. F16H 1/28; F16D 55/02; B60K 7/00; B60K 17/043; B60K 17/046; B62D 51/005
See application file for complete search history.

(56) References Cited

U.S. PATENT DOCUMENTS

| | | | |
|---|---|---|---|
| 3,704,759 A | 12/1972 | Vitkov et al. | |
| 7,165,640 B2 * | 1/2007 | Laurent | B60K 7/0007 180/65.51 |

(Continued)

FOREIGN PATENT DOCUMENTS

| | | |
|---|---|---|
| EP | 1403118 A2 | 3/2004 |
| GB | 1455069 | 11/1976 |

(Continued)

OTHER PUBLICATIONS

Communication pursuant to Article 94(3) EPC dated Mar. 22, 2019 issued in corresponding European Patent Application No. 17 208 830.4.

*Primary Examiner* — Patrick H Mackey
(74) *Attorney, Agent, or Firm* — Pillsbury Winthrop Shaw Pittman, LLP

(57) ABSTRACT

A speed reducing device for a carriage includes: a base fixed to a carriage body; a carrier fixed to the base; a case to which a wheel is detachably attached; a reducer that is supported by the carrier, decelerates power input thereto, and transmits the power to the case to rotate the case; and a flange fixed to the base or the carriage body and separately provided from the carrier. The flange supports a brake unit that is for braking the power input to the reducer.

7 Claims, 1 Drawing Sheet

(56) References Cited

U.S. PATENT DOCUMENTS

| | | | | |
|---|---|---|---|---|
| 8,771,132 B2* | 7/2014 | Fujimoto | ............ | B60K 17/046 |
| | | | | 475/311 |
| 8,925,662 B2* | 1/2015 | Han | .................... | B60K 17/043 |
| | | | | 180/65.51 |
| 9,156,353 B2* | 10/2015 | Dedo | .................. | F16H 61/0059 |
| 2012/0161497 A1* | 6/2012 | He | ....................... | B60K 7/0007 |
| | | | | 301/6.5 |
| 2014/0333120 A1* | 11/2014 | Pozzo | .................. | B60K 7/0007 |
| | | | | 301/6.5 |

FOREIGN PATENT DOCUMENTS

| | | | | | |
|---|---|---|---|---|---|
| GB | 1455069 | A | * 11/1976 | ........... | B60K 7/0007 |
| JP | 62-059348 | U | 4/1987 | | |
| JP | 1-65969 | U | 4/1989 | | |
| JP | 2000-233649 | A | 8/2000 | | |
| JP | 2010-78131 | A | 4/2010 | | |
| JP | 2012071810 | A | * 4/2012 | ........... | B60K 7/0007 |
| WO | 2012/042806 | A1 | 4/2012 | | |

* cited by examiner

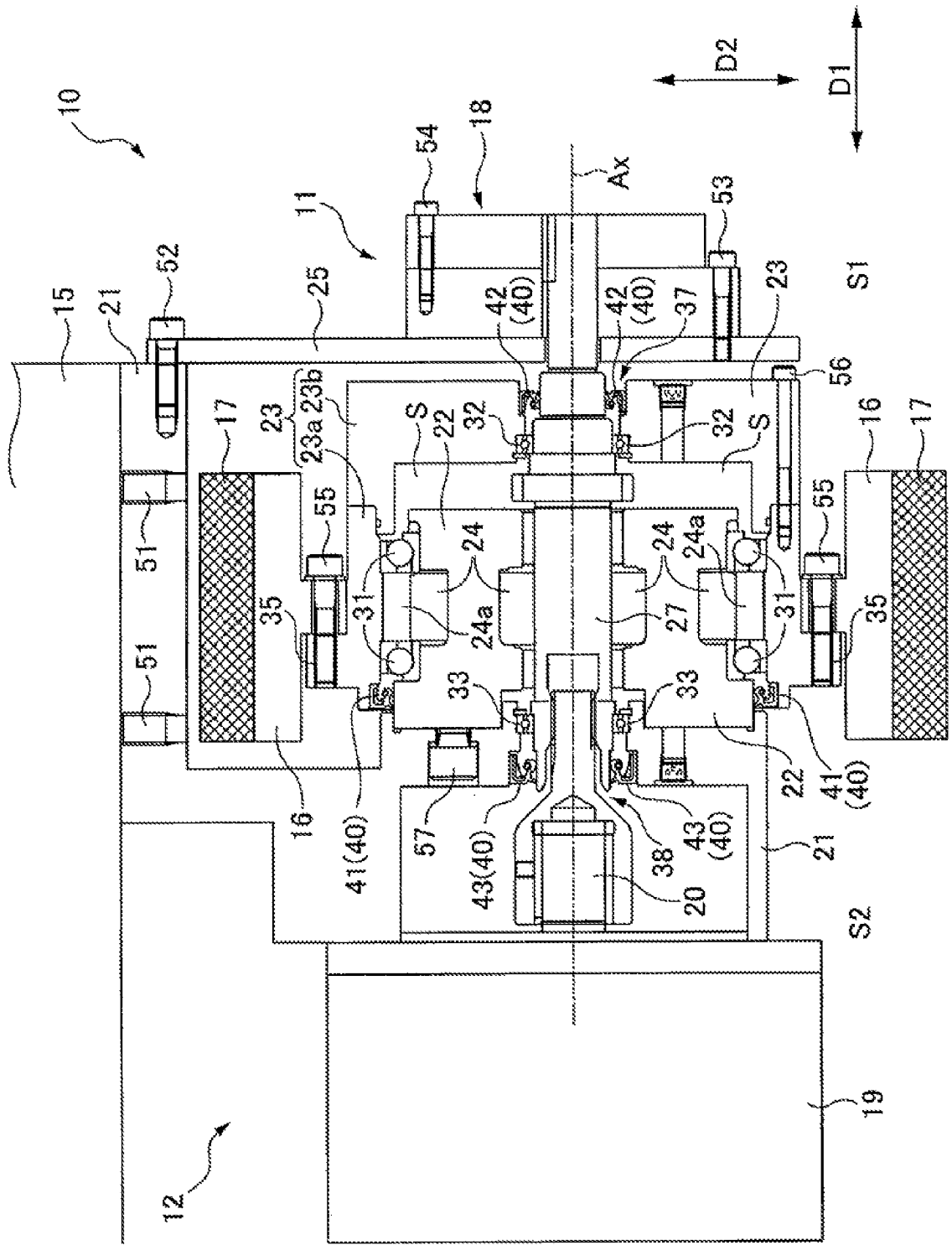

SPEED REDUCING DEVICE FOR CARRIAGE AND DRIVING DEVICE FOR CARRIAGE

CROSS-REFERENCE TO RELATED APPLICATIONS

This application is based on and claims the benefit of priority from Japanese Patent Application Serial No. 2016-253897 (filed on Dec. 27, 2016), the contents of which are hereby incorporated by reference in its entirety.

TECHNICAL FIELD

The present invention relates to a speed reducing device for a carriage in which wheels can be detachably attached.

BACKGROUND

Carriages propelled by motors are widely used in various applications. Not only manned controlled carriages but also unmanned carriages such as Rail Guided Vehicles (RGVs) and Automatic Guided Vehicles (AGVs) are known. Outputs of motors in these carriages are transmitted to wheels via reducers and the carriages travel.

For example, Japanese Utility Model Application Publication No. Sho 62-59348 ("the '348 Publication") discloses a driving device for wheels using a planetary gear mechanism. In this driving device, a speed reducer is provided in the wheel to downsize and simplify the device. Japanese Utility Model Application Publication No. Hei 1-65969 ("the '969 Publication") discloses a special planetary gear reducer. In this reducer, a space for storing a pin for an external gear is reduced, and the speed reducer as a whole is downsized. Japanese Patent Application Publication No. 2000-233649 ("the '649 Publication") discloses a driving wheel mechanism for an unmanned vehicle. With this driving wheel mechanism, drive wheels are reduced in size while ensuring sufficient load bearing performance, and the height and width of the unmanned vehicle are reduced.

In the above-described carriages, a wheel is attached to a turning portion of the reducer. In order to replace wheels of such a carriage, it was necessary to detach the entire drive unit that includes the wheels and the speed reducers from the carriage body, or to disassemble the speed reducer. Moreover, when replacing a brake unit of the carriage, it was necessary to detach the entire drive unit that includes the wheels and the speed reducers from the carriage body. Thus, removal and replacement of the wheels and the brake unit in the conventional carriages were extremely time consuming tasks.

For example, in the driving device described in the '348 Publication, an internal gear of the speed reducer and the like are disposed between an inner cover and an outer cover of a wheel. Accordingly, it is not possible for this driving device to remove only the wheel. To remove the wheel, it is necessary to disassemble the speed reducer. Moreover, to remove the wheel and a turning annulus (or a tire), it is necessary to remove a part or the whole of the frame that surrounds the wheel and the turning annulus. When a part or the whole of this frame is removed, a bearing provided on the outer side of the wheel (especially an outer cover) are exposed, which is not desirable. Furthermore, unless the bearing is removed, the wheel and the turning annulus cannot be removed.

As for the speed reducer described in the '969 Publication, since the turning portion (i.e., the case) of the reducer and the wheel are integrally formed, it is structurally impossible to separate only the wheel from the reducer. Even if the tire can be separated from the wheel, in order to remove the tire, it is necessary to further remove a housing and a side plate that surround the tire. However, since components of the reducer such as pins are supported by the side plate, it is structurally inevitable that the reducer is disassembled when the side plate is removed. It is not practical to replace only the tire while the wheel is attached to the carriage body. The tire is usually removed together with the wheel to replace the tire.

As for the mechanism described in the '649 Publication, a disk-shaped transmission plate is attached to an output portion of the reducer with a bolt, a wheel is attached to the outer peripheral edge of the transmission plate by bolts, and a holder ring is attached to the wheel. Therefore, in order to detach the wheel, these bolts have to be removed to detach the transmission plate and separate the wheel from the holder ring, which is time-consuming and troublesome. Moreover, when the wheel is removed, the bearing provided between a main bracket and the wheel is exposed, which is undesirable. Further, in the mechanism of The '649 Publication, since the transmission plate is provided so as to cover the reducer on the outside of the carriage body and rotates together with the output portion of the reducer, it is impossible to attach a device such as a brake unit to the transmission plate, which is inconvenient.

SUMMARY

In view of the above, one object of the invention is to provide a speed reducing device for carriage and a driving device for a carriage in which wheels can be easily detached. Another object of the invention is to provide a speed reducing device for carriage and a driving device for a carriage in which a brake unit can be easily detached.

One aspect of the invention relates to a driving device for a carriage. The driving device includes a speed reducing device that is supported by a carriage body, reduces a speed of rotation input thereto and outputs the rotation from an output element; a wheel detachably attached to the output element of the speed reducing device; a flange directly or indirectly supported by the carriage body; and a brake unit retained by the flange for braking the wheel. The brake unit and the wheel are detachable from the output element by moving the brake unit and the wheel toward one side along a rotation axis of the output element while the speed reducing device is retained on the output element.

The speed reducing device includes a carrier supported in a stationary state with respect to the carriage body; a case to which a wheel is detachably attached and which serves as the output element; a reducer that is supported by the carrier, reduces a speed of rotation input thereto and transmits the rotation to the case to rotate the case. The case may be situated on the outer side of the carrier and the reducer in the radial direction perpendicular to the rotation axis. The wheel may be situated outside the case in the radial direction.

The speed reducing device may be fixed to the carriage body and may further include the base coupled to the carrier from the other side along the rotation axis.

Further included may be a motor disposed on the other side along the rotation axis with respect to the speed reducing device, and an input shaft that transmits rotation of the motor to the reducer, penetrates the carrier and reaches to the brake unit.

Another aspect of the invention relates to a speed reducing device for a carriage. The speed reducing device includes: a base fixed to a carriage body; a carrier fixed to the base; a case to which a wheel is detachably attached; a reducer that is supported by the carrier, decelerates power input thereto, and transmits the power to the case to rotate the case; and a flange fixed to the base or the carriage body and separately provided from the carrier. The flange supports a brake unit that is for braking the power input to the reducer.

The flange may be provided such that it does not hold the case.

The flange may be formed separately from the case.

The speed reducing device for a carriage may further include a first bearing disposed between the carrier and the case, and a seal portion for sealing a space surrounded by the base and the case. The reducer, the carrier and the first bearing may be disposed in the space sealed by the seal portion.

The speed reducing device for a carriage may further include an input shaft for inputting power to the reducer. The input shaft is provided so as to penetrate the space in a rotation axis direction in which a rotation axis of the case extends. The speed reducing device may further include a second bearing disposed between the input shaft and the case, and a third bearing disposed between the input shaft and the base. The second bearing and the third bearing are disposed in the space sealed by the seal portion. The seal portion may include a first seal element for sealing between the base or the carrier and the case, a second seal element for sealing between the case and the input shaft, and a third seal element for sealing between the base and the input shaft.

The brake unit may be provided at a portion of the input shaft that protrudes out from the space sealed by the seal portion toward one side, and a motor may be provided at a portion of the input shaft that protrudes out from the space sealed by the seal portion toward the other side.

The flange may be detachably provided on the base or the carriage body on one side of the reducer in a rotation axis direction in which a rotation axis of the case extends. The case may have an attachment portion that projects in a direction perpendicular to the rotation axis. A part of the wheel located on the one side in the rotation axis direction compared to the attachment portion may be attached on the attachment portion. Only the attachment portion of the case may overlap the wheel with respect to the rotation axis direction.

According to the aspects of the invention, it is possible to easily detach the wheel. Moreover, it is possible to easily replace the brake unit according to the aspects of the invention.

BRIEF DESCRIPTION OF THE DRAWINGS

FIG. 1 illustrates a carriage according to an embodiment of the invention.

DESCRIPTION OF THE EMBODIMENTS

With reference to the accompanying drawings, the following describes one embodiment of the invention. The accompanying drawings are schematically illustrated and the components of the drawings are not necessarily drawn to scale, and the dimensional ratio between the elements and shapes of the components may be different from the actual ones. However, with the schematic drawings accompanied with the specification, the embodiment described below and other embodiments of the invention would be sufficiently understood by one of ordinary skill in the art.

FIG. 1 illustrates a carriage 10 according to an embodiment of the invention. FIG. 1 partially illustrates the carriage 10 as viewed from the side and cross-sections of some components of the carriage 10 are shown.

The carriage 10 includes a carriage body 15 and a driving device 12 supported by the carriage body 15. The driving device 12 includes a speed reducing device 11 and a motor 19. The motor 19 is coupled to the speed reducing device 11. A power output by the motor 19 is transmitted to a wheel 16 via the speed reducing device 11, which rotationally drives a tire 17 retained on the wheel 16.

The speed reducing device 11 includes a base 21 fixed to the carriage body 15 by a fixing member 51 such as a bolt, a carrier 22 fixed to the base 21 by a fixing member 57, and a reducer 24 supported by the carrier 22. The carrier 22 is supported unrotatably with respect to the carriage body 15, and is supported in a stationary state with respect to the carriage body 15.

The reducer 24 reduces a rotational speed of a power that is input from an input shaft 27 and transmits the power with an increased torque to a case 23, which rotates the case 23. In the speed reducing device 11, the case 23 serves as an output element that outputs decelerated rotation. The reducer 24 may be typically configured as a planetary gear speed reducer or an eccentric oscillating type speed reducer, the configuration of the reducer 24 is not particularly limited. The reducer 24 may be constituted by a deceleration structure in which the planetary gear speed reducer and the eccentric oscillating type speed reducer are combined, or the reducer 24 may be constituted by any other type of deceleration mechanism.

The case 23 rotatably engages with an output portion 24a of the reducer 24 and is rotated around a rotation axis Ax in accordance with the power transmitted from the output portion 24a of the reducer 24. The wheel 16 is detachably attached to the case 23, and the case 23 rotates in conjunction with the wheel 16 and the tire 17. The case 23 has an attachment portion 35, and a protruding portion of the wheel 16 is fixed to the attachment portion 35 by a fixing member 55. The attachment portion 35 is provided so as to project in a radial direction D2 which is perpendicular to the rotation axis Ax in the case 23. The wheel 16 is disposed on one side S1 (that is, the side toward the outer side of the carriage body) of the attachment portion 35 with respect to the rotation axis direction D1 and the wheel 16 is fixed to the attachment portion 35. Specifically, a part of the wheel 16 located on the one side S1 in the rotation axis direction compared to the attachment portion 35 is attached on the attachment portion 35. The case 23 is situated on the outer side of the carrier 22 and the reducer 24 in the radial direction D2, that is, the case 23 is situated at a longer distance from the rotation axis Ax in the radial direction D2 compared to the carrier 22 and the reducer 24. The wheel 16 is situated outside the case 23 in the radial direction D2. The rotation axis direction D1 here is the direction in which the rotation axis Ax of the case 23 extends. In the embodiment, a motor output shaft 20, the input shaft 27, the case 23, the wheel 16 and the tire 17 are rotated about the common rotation axis Ax.

Only the attachment portion 35 of the case 23 overlaps the wheel 16 with respect to the rotation axis direction D1. Therefore, when the wheel 16 is detached from the attachment portion 35 and moved it to the one side S1 for replacement of the wheel 16 and the tire 17, the case 23 does not inhibit the movement of the wheel 16 and the tire 17 so that the wheel 16 and the tire 17 can be smoothly removed from the carriage 10. The wheel 16 and the tire 17 shown in FIG. 1 are overlapped with only a flange 25 and the fixing member 55 when the wheel 16 and the tire 17 are attached to the case 23 on the one side S1 (that is, the outer side of the carriage body) in the rotation axis direction D1. When the flange 25 and the fixing member 55 are removed, the wheel 16 and the tire 17 do not overlap with other components of the carriage 10. Therefore, after the flange 25 is detached from the carriage body 15 together with a brake unit 18 which will be later described, it is possible to detach the wheel 16 from the speed reducing device 11 by moving the wheel to the one side in the rotation axis direction D1 while the case 23 that serves as the output element remains attached to the speed reducing device 11.

The base 21 fixed to the carriage body 15 is coupled to the carrier 22 from the other side in the rotation axis direction D1. Further, the motor 19 is also disposed on the other side in the rotation axis direction D1 with respect to the speed reducing device 11. Therefore, when the wheel 16 is removed from the case 23 by moving the wheel 16 to the one side in the rotation axis direction D1, the motor 19 and the base 21 do not interfere with the wheel 16.

The case 23 of the embodiment is formed by coupling a cylindrical member 23a that extends mainly in the rotation axis direction D1 with a disk-shaped member 23b that extends mainly in the radial direction D2 by using a fixing member 56. As shown in FIG. 1, a through hole 37 extending in the rotation axis direction D1 is formed in the central portion of the disk-shaped member 23b as viewed in the radial direction D2. The input shaft 27 penetrates the through hole 37. The case 23 with the above-described configuration defines an internal space S together with the base 21. Referring to FIG. 1, the right side (that is, the one side S1), the upper side and the lower side of the internal space S are defined by the case 23, and the left side (that is, the other side S2) of the internal space S is defined by the base 21.

The internal space S surrounded by the base 21 and the case 23 is sealed by a seal portion 40. The seal portion 40 in the embodiment includes a first seal element 41 that seals between the base 21 or the carrier 22 and the case 23, a second seal element 42 that seals between the case 23 and the input shaft 27, and a third sealing element 43 that seals between the base 21 and the input shaft 27. The reducer 24, the carrier 22, and the bearings (a first bearing 31, a second bearing 32 and a third bearing 33 which will be described later) are disposed within the internal space S that is sealed and enclosed by the seal portion 40. The reducer 24, the carrier 22, and the bearings are not exposed to the outside of the case 23 and the outside of the base 21.

The first bearing 31 is disposed between the carrier 22 and the case 23. In the speed reducing device shown in FIG. 1, two pairs of the first bearings 31 are provided, and the first bearings 31 are arranged so as to be separated from each other with respect to the rotation axis direction D1. In this way, the case 23 (in particular, the cylindrical member 23a) is supported by the carrier 22 in the radial direction D2 and the case can rotate independently from the carrier 22 that remains stationary.

The second bearing 32 is disposed between the input shaft 27 and the case 23, and the third bearing 33 is disposed between the input shaft 27 and the base 21. Accordingly, the input shaft 27 is supported by the base 21 and the case 23 in the radial direction D2, and the input shaft 27 can rotate irrespective of states of the base 21 and the case 23.

The flange 25 provided separately from the carrier 22 is fixed to the base 21 by a fixing member 52. The flange 25 of this embodiment is detachably provided on the base 21, and is disposed on the outer side of the carriage body (that is, the one side S1) rather than at the reducer 24 and the case 23 in the rotation axis direction D1. The flange 25 is provided separately from the case 23 as a separate body, and does not hold the case 23. Moreover, the flange 25 is provided so as to support the brake unit 18 that is for braking the power input to the reducer 24 from the input shaft 27. The brake unit 18 shown in FIG. 1 is attached to the flange 25 by a fixing member 53.

The input shaft 27 that serves as an input gear for inputting the power to the reducer 24 is provided so as to penetrate the internal space S in the rotation axis direction D1 and pass through the through hole 37 formed in the case 23 and a through hole 38 formed in the base 21. An end portion of the input shaft 27 on the one side S1 (that is, on the outer side of the carriage body) penetrates the flange 25 and penetrates at least a part of the brake unit 18. On the other hand, an end portion of the input shaft 27 on the other side S2 reaches to a position where it can be coupled to a motor output shaft 20. In the embodiment, the brake unit 18 hampers the rotation of the input shaft 27, and eventually the wheel 16 can be stopped.

Configuration of the brake unit 18 is not specifically limited, but the brake unit 18 may typically have an electromagnetic brake structure. For example, a brake disc is fixed to the input shaft 27 so as to rotate in conjunction with the input shaft 27. The position of an armature that is biased toward the brake disc by a spring is changed by ON/OFF of energization of an electromagnetic coil. Such an electromagnetic brake structure capable of turning ON/OFF of a frictional engagement between the armature and the brake disc. The brake unit 18 can adopt this electromagnetic brake structure. The brake unit 18 shown in FIG. 1 is configured by combining two sections, and these sections are fixed together by a fixing member 54.

The motor 19 is detachably attached to the base 21 by a fixing member (not shown). Further, the motor output shaft 20 is detachably attached to one end of the input shaft 27 (the end on the other side S2 in FIG. 1). Therefore, the motor 19 and the motor output shaft 20 can be replaced when necessary. The motor output shaft 20 and the input shaft 27 coupled to each other rotate together around the rotation axis Ax, and the rotational power output from the motor 19 is transmitted to the input shaft 27.

According to the carriage 10 and the speed reducing device 11 that have the above-described configuration, the wheel 16 is cantilever-supported via the speed reducing device 11 so that it is easy to replace the wheel 16 and the tire 17 by removing them from the outer side of the carriage body (from the one side S1). Moreover, the brake unit 18 is provided at the portion of the input shaft 27 where protrudes out from the internal space S that is sealed by the seal portion 40 toward the one side S1. The motor 19 is provided at the portion of the input shaft 27 that protrudes out from the internal space S that is sealed by the seal portion 40 toward the other side S2. By using the input shaft 27 having such a structure, it is possible to realize both the "cantilever mechanism of the wheel 16" and the "mechanism in which the brake unit 18 is disposed on the outer side of the carriage body (that is, the one side S1)." Further, by adopting the structure in which a braking force is directly applied from the brake unit 18 to the input shaft 27, it is possible to stop the input shaft 27 with a relatively small brake torque and to put a brake on the wheel 16.

Since the bearing is not disposed between the case 23 and the flange 25, it is possible to detach the flange 25 together with the brake unit 18 from the base 21 without disassembling the speed reducing device 11 and while the wheel remains attached to the speed reducing device 11. By further removing the flange 25 from the base 21, an operator is able to attach or detach the wheel 16 and the tire 17 from/to the outer side of the carriage body S1. Therefore the operator can easily replace the wheel 16 and the tire 17.

Moreover, since the brake unit 18 is attached to the flange 25, the brake unit 18 can be easily installed or removed to/from the outer side of the carriage body S1, which is highly convenient.

Further, the internal space S surrounded by the base 21 and the case 23 is sealed from the outside by the seal portion 40 (that is, the first seal element 41, the second seal element 42, and the third seal element 43). This prevents the outside air and foreign substances from entering into the internal space S and prevents oil or the like from flowing out from the internal space S to the outside. Therefore, it is possible to protect the carrier 22, the reducer 24 and the bearings (the first bearing 31, the second bearing 32, and the third bearing 33) disposed in the inner space S from the outside air, and it is also possible to protect the components disposed outside such as the wheel 16 and the tire 17 from oil and the like in the internal space S. In particular, even when the flange 25 is detached from the base 21, since the carrier 22, the reducer 24 and the bearings are not exposed to the outside, attachment and detachment of the wheel 16 and the tire 17 to/from the case 23 can be performed without contaminating each component with oil or the like.

It should be noted that the above-described carriage 10 is applicable to all kinds of carriages in which power from the motor 19 is transmitted to the wheel 16 via the speed reducing device 11. For example, the speed reducing device 11 and the carriage 10 of the invention can be applied not only to carriages that require assistance by an operator when traveling but also to carriages (i.e., an unmanned conveyance vehicle) such as AGVs or RGVs that do not require assistance by an operator when traveling.

The invention is not limited to the above-described embodiments and modification examples. For example, various modifications may be made to the respective elements of the embodiment and the modification examples described above. The invention also encompasses embodiments including components and/or methods other than the above-described components and/or methods. The invention also encompasses embodiments in which some of the above-described components and/or methods are not provided. Further, advantageous effects of the invention are not limited to the above-described ones, and there may be a specific effect depending on a specific configuration of each embodiment.

What is claimed is:

1. A speed reducing device for a carriage, comprising:
   a base fixed to a carriage body;
   a carrier fixed to the base;
   a case to which a wheel is detachably attached;
   a reducer supported by the carrier, the reducer decelerating power input thereto and transmitting the power to the case to rotate the case; and
   a flange fixed to the base or the carriage body and separately provided from the carrier, the flange supporting a brake unit that is for braking the power input to the reducer,
   wherein the flange is provided such that the flange is not connected to the case.

2. The speed reducing device for a carriage according to claim 1, wherein the flange is provided separately from the case.

3. The speed reducing device for a carriage according to claim 1, further comprising:
   a first bearing disposed between the carrier and the case; and
   a seal portion for sealing a space surrounded by the base and the case,
   wherein the reducer, the carrier and the first bearing are disposed in the space sealed by the seal portion.

4. The speed reducing device for a carriage according to claim 3, further comprising:
   an input shaft for inputting power to the reducer, the input shaft being provided so as to penetrate the space in a rotation axis direction in which a rotation axis of the case extends;
   a second bearing disposed between the input shaft and the case; and
   a third bearing disposed between the input shaft and the base, wherein the second bearing and the third bearing are disposed in the space sealed by the seal portion, and
   wherein the seal portion includes a first seal element for sealing between the base or the carrier and the case, a second seal element for sealing between the case and the input shaft, and a third seal element for sealing between the base and the input shaft.

5. The speed reducing device for a carriage according to claim 4, wherein the brake unit is provided at a portion of the input shaft that protrudes out from the space sealed by the seal portion toward one side, and a motor is provided at a portion of the input shaft that protrudes out from the space sealed by the seal portion toward the other side.

6. The speed reducing device for a carriage according to claim 1, wherein the flange is detachably provided on the base or the carriage body on one side of the reducer in a rotation axis direction in which a rotation axis of the case extends,
   wherein the case has an attachment portion that projects in a direction perpendicular to the rotation axis,
   wherein a part of the wheel located on the one side in the rotation axis direction compared to the attachment portion is attached on the attachment portion, and
   wherein only the attachment portion of the case overlaps the wheel with respect to the rotation axis direction.

7. A driving device for a carriage, comprising:
   a speed reducing device supported by a carriage body, the speed reducing device reducing a speed of rotation input thereto and outputting the rotation from an output element;
   a wheel detachably attached to the output element of the speed reducing device;
   a flange directly or indirectly supported by the carriage body; and
   a brake unit retained by the flange for braking the wheel,
   wherein the brake unit and the wheel are detachable from the output element by moving the brake unit and the wheel toward one side along a rotation axis of the output element while the speed reducing device is retained on the output element.

* * * * *